(12) United States Patent
Kim et al.

(10) Patent No.: US 9,107,175 B2
(45) Date of Patent: Aug. 11, 2015

(54) UPLINK TRANSMISSION POWER CONFIGURATION METHOD AND APPARATUS FOR MOBILE COMMUNICATION SYSTEM

(75) Inventors: Soeng Hun Kim, Yongin-si (KR); Gert-Jan Van Lieshout, Staines (GB); Joon Young Cho, Suwon-si (KR); Boon Loong Ng, Richardson, TX (US); Kyeong In Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 14 days.

(21) Appl. No.: 13/347,990

(22) Filed: Jan. 11, 2012

(65) Prior Publication Data

US 2012/0176979 A1 Jul. 12, 2012

Related U.S. Application Data

(60) Provisional application No. 61/431,635, filed on Jan. 11, 2011.

(30) Foreign Application Priority Data

Sep. 27, 2011 (KR) .................. 10-2011-0097409
Dec. 26, 2011 (KR) .................. 10-2011-0142069

(51) Int. Cl.
*H04W 52/14* (2009.01)
*H04W 52/36* (2009.01)

(52) U.S. Cl.
CPC .......... *H04W 52/365* (2013.01); *H04W 52/146* (2013.01); *H04W 52/367* (2013.01); *Y02B 60/50* (2013.01)

(58) Field of Classification Search
USPC .......................................... 370/329
See application file for complete search history.

(56) References Cited

U.S. PATENT DOCUMENTS 5,774,785 A * 6/1998 Karlsson ................. 455/522
6,735,447 B1 * 5/2004 Muller ..................... 455/522

(Continued)

FOREIGN PATENT DOCUMENTS

| KR | 10-2008-0036506 A | 4/2008 |
| KR | 10-2009-0077647 A | 7/2009 |
| KR | 10-2010-0091326 A | 8/2010 |

*Primary Examiner* — Omar Ghowrwal
*Assistant Examiner* — Ellen A Kirillova
(74) *Attorney, Agent, or Firm* — Jefferson IP Law, LLP

(57) ABSTRACT

A method and an apparatus for configuring uplink transmission power and apparatus in a mobile communication system supporting downlink and uplink carrier aggregation are provided. The method includes determining a per-terminal maximum transmission power and per-serving cell maximum transmission powers based on $\Delta T_{C,c}$ as a value for allowing an adjustment of additional transmission power for multiple serving cells, Maximum Power Reduction$_c$ ($MPR_c$) as a value determined according to an amount of transmission resources allocated to the terminal, and Additive-$MPR_c$ (A-$MPR_c$) as a value determined according to local characteristics and frequency band characteristics, determining per-serving cell uplink transmission powers by restricting required transmission powers for respective serving cells to the corresponding per-serving cell maximum transmission powers, comparing a sum of the per-serving cell uplink transmission powers with the per-terminal maximum transmission power, and adjusting the per-serving cell uplink transmission powers according to comparison result.

18 Claims, 10 Drawing Sheets

(56) References Cited

U.S. PATENT DOCUMENTS

| | | |
|---|---|---|
| 7,986,958 B2 | 7/2011 | Heo et al. |
| 2006/0094439 A1* | 5/2006 | Christian .................... 455/452.2 |
| 2006/0286994 A1* | 12/2006 | Kwak et al. ................... 455/522 |
| 2008/0175192 A1* | 7/2008 | Roberts ......................... 370/329 |
| 2009/0305709 A1* | 12/2009 | Panico et al. ................. 455/446 |
| 2010/0034114 A1* | 2/2010 | Kim et al. ..................... 370/252 |
| 2010/0061480 A1* | 3/2010 | Kashiwase et al. ........... 375/295 |
| 2010/0215017 A1* | 8/2010 | Li et al. ......................... 370/330 |
| 2010/0273515 A1* | 10/2010 | Fabien et al. ................. 455/509 |
| 2011/0051685 A1* | 3/2011 | Saitou .......................... 370/331 |
| 2011/0105140 A1* | 5/2011 | Cheon et al. .................. 455/453 |
| 2011/0148519 A1* | 6/2011 | Drogi et al. ................... 330/129 |
| 2011/0171988 A1 | 7/2011 | Kim et al. |
| 2012/0184327 A1* | 7/2012 | Love et al. ................. 455/552.1 |

* cited by examiner

UPLINK TRANSMISSION POWER CONFIGURATION METHOD AND APPARATUS FOR MOBILE COMMUNICATION SYSTEM

CROSS-REFERENCE TO RELATED APPLICATIONS

This application claims the benefit under 35 U.S.C. §119 (e) of U.S. Provisional patent application No. 61/431,635 filed on Jan. 11, 2011 in the U.S. Patent and Trademark Office, and under 35 U.S.C. §119(a) of a Korean patent application filed on Sep. 27, 2011 in the Korean Intellectual Property Office and assigned Serial No. 10-2011-0097409 and a Korean patent application filed on Dec. 26, 2011 in the Korean Intellectual Property Office and assigned Serial No. 10-2011-0142069, the entire disclosure of each of which is hereby incorporated by reference.

BACKGROUND OF THE INVENTION

1. Field of the Invention

The present invention relates to an uplink transmission power configuration method and apparatus of a mobile communication system. More particularly, the present invention relates to a method and apparatus for configuring uplink transmission power in a mobile communication system supporting downlink and uplink carrier aggregation.

2. Description of the Related Art

Mobile communication systems were originally developed to provide subscribers with voice communication services on the move. With the rapid advancement of various technologies, the mobile communication systems have evolved to support high speed data communication services as well as the voice communication services.

Recently, a next generation mobile communication system of the 3rd Generation Partnership Project (3GPP), referred to as a Long Term Evolution (LTE) system, is under development. The LTE system is a technology for realizing high-speed packet-based communication at about 100 Mbps. Recently, an LTE-Advanced (LTE-A) system is actively discussed as an evolution of the LTE system. The LTE-A system employs new techniques to increase the data rate. Hereinafter, both the legacy LTE system and LTE-A system are referred to as the LTE system. The LTE system employs carrier aggregation as one of the significant technologies to meet broader bandwidth requirements. The carrier aggregation is a technology for a User Equipment (UE) to transmit/receive data over multiple carriers. More specifically, the UE transmits/receives data in cells using carriers that are aggregated (for cells under the control of the same evolved Node B (eNB)). This means that the UE transmits/receives data in multiple cells.

In a mobile communication system of the related art, the single carrier uplink transmission power of a UE is calculated based on the scheduled resource amount, coding rate, and channel condition. The UE determines the final uplink transmission power by limiting the calculated transmission power to a predetermined maximum transmission power.

However, the uplink transmission power configuration technique of the related, which is designed for single carrier uplink transmission, is not appropriate for the multicarrier uplink transmission. Therefore, there is a need for a method for configuring uplink transmission power per uplink carrier in the system supporting uplink carrier aggregation that is capable maintaining a UE's required transmission power as much as possible while minimizing interference between frequency bands or cells.

SUMMARY OF THE INVENTION

Aspects of the present invention are to address at least the above-mentioned problems and/or disadvantages and to provide at least the advantages described below. Accordingly, an aspect of the present invention is to provide a method and apparatus for determining per-carrier uplink transmission power of a User Equipment (UE) in a mobile communication system supporting carrier aggregation.

Another aspect of the present invention is to provide a method and apparatus for determining per-carrier uplink transmission power that is capable of securing the transmission power required for multicarrier uplink transmission while minimizing inter-carrier interference.

In accordance with an aspect of the present invention, a method for determining uplink transmission power of a terminal is provided. The method includes determining a per-terminal maximum transmission power and per-serving cell maximum transmission powers based on $\Delta T_{C,c}$ as a value for allowing an adjustment of additional transmission power for multiple serving cells, Maximum Power Reduction$_c$ (MPR$_c$) as a value determined according to an amount of transmission resources allocated to the terminal, and Additive-MPR$_c$ (A-MPR$_c$) as a value determined according to local characteristics and frequency band characteristics, determining per-serving cell uplink transmission powers by restricting required transmission powers for respective serving cells to the corresponding per-serving cell maximum transmission powers, comparing a sum of the per-serving cell uplink transmission powers with the per-terminal maximum transmission power, and adjusting the per-serving cell uplink transmission powers according to comparison result.

Preferably, the per-terminal maximum transmission power is determined in consideration of at least one of P(Power management)-MPR applied for fulfilling a Specific Absorption Rate (SAR) requirement, the $\Delta T_{C,c}$, the MPR$_c$, and the A-MPR$_c$.

In accordance with another aspect of the present invention, a method for determining uplink transmission power of a terminal is provided. The method includes determining a per-terminal maximum transmission power with per-serving cell maximum transmission powers based on P-MPR applied for fulfilling a SAR requirement, $\Delta T_{C,c}$ as a value for allowing an adjustment of additional transmission power for multiple serving cells, MPR$_c$ as a value determined according to an amount of transmission resources allocated to the terminal, and A-MPR$_c$ as a value determined according to local characteristics and frequency band characteristics, determining per-serving cell uplink transmission powers by restricting required transmission powers for respective serving cells to the corresponding per-serving cell maximum transmission powers, comparing a sum of the per-serving cell uplink transmission powers with the per-terminal maximum transmission power, and adjusting the per-serving cell uplink transmission powers according to comparison result.

Preferably, the per-serving cell maximum transmission powers are determined using at least one of the $\Delta T_{C,c}$, the MPR$_c$, and the A-MPR$_c$.

In accordance with still another aspect of the present invention, an apparatus for determining uplink transmission power is provided. The apparatus includes a transceiver which transmits and receives data and control signals in multiple serving cells, and a controller which determines, when an uplink transmission message is received by the transceiver, a per-terminal maximum transmission power and per-serving cell maximum transmission powers using parameters related to frequencies or frequency bands of cells having uplink transmission, which determines per-serving cell uplink transmission powers by comparing required transmission powers for respective serving cells with corresponding per-serving cell maximum transmission powers, which determines final per-serving cell uplink transmission powers by comparing a sum of the per-serving cell uplink transmission powers with the per-terminal maximum transmission power, and which controls the transceiver to perform uplink transmission according to the final per-serving cell uplink transmission powers.

Preferably, the per-serving cell maximum transmission powers are determined based on $\Delta T_{C,c}$ as a value for allowing an adjustment of additional transmission power for multiple serving cells, $MPR_c$ as a value determined according to an amount of transmission resources allocated to the terminal, and $A\text{-}MPR_c$ as a value determined according to local characteristics and frequency band characteristics.

Preferably, the per-terminal maximum transmission power is determined in consideration of P-MPR applied for fulfilling a SAR requirement, $\Delta T_{C,c}$ as a value for allowing adjustment of additional transmission power for multiple serving cells, $MPR_c$ as a value determined according to an amount of transmission resources allocated to the terminal, and $A\text{-}MPR_c$ as a value determined according to local characteristics and frequency band characteristics.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to a method for configuring uplink transmission power per uplink carrier in a mobile communication system supporting carrier aggregation.

Figure 1:
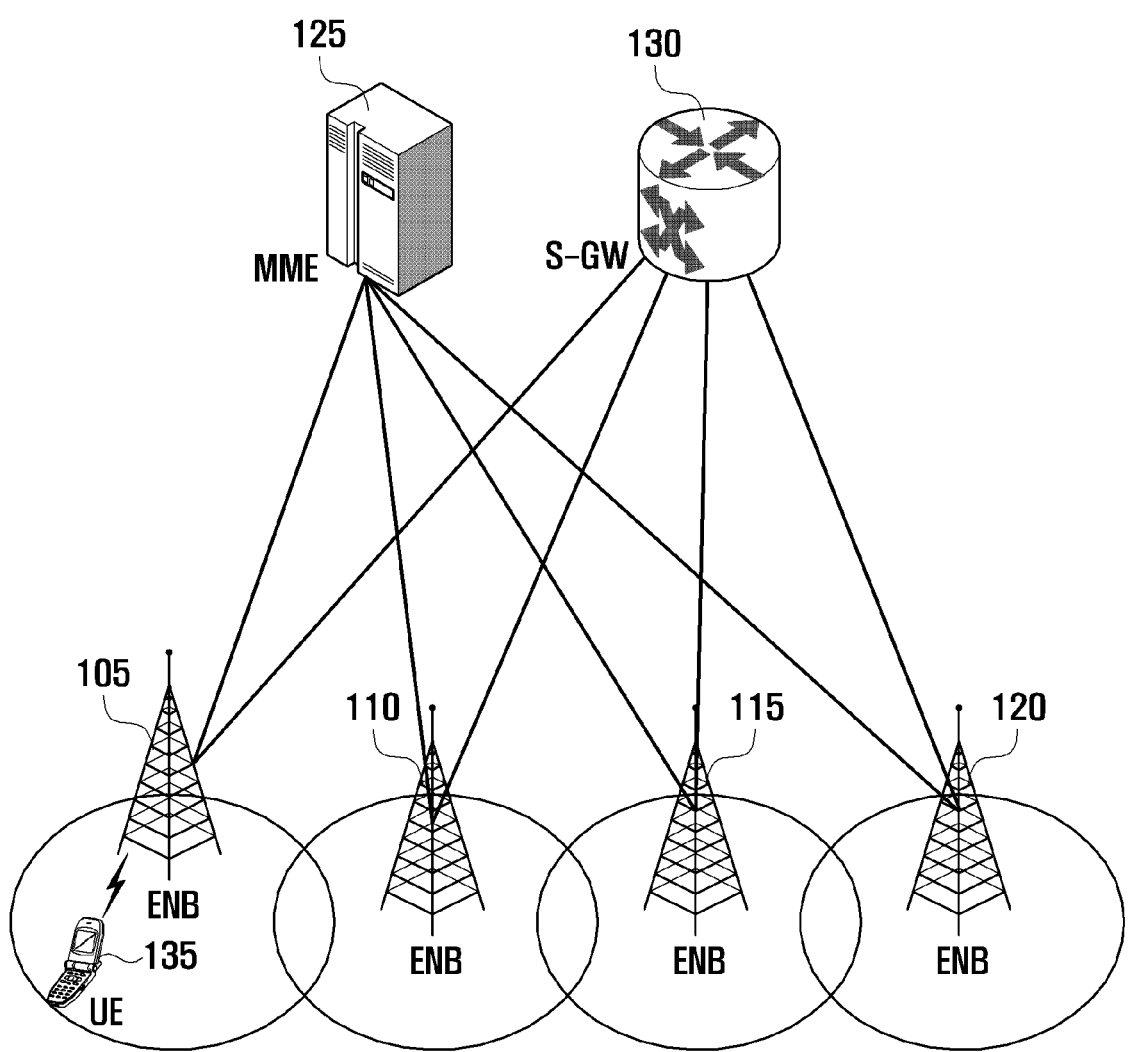
FIG. 1 is a diagram illustrating an architecture of a mobile communication system according to an exemplary embodiment of the present invention.

FIG. 1 is a diagram illustrating an architecture of a mobile communication system according to an exemplary embodiment of the present invention.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. User Equipment (UE) 135 connects to an external network via eNBs 105, 110, 115, and 120 and the S-GW 130.

The eNBs 105, 110, 115, and 120 correspond to legacy node Bs of a Universal Mobile Communications System (UMTS). The eNBs 105, 110, 115, and 120 allow the UE 135 to establish a radio link and are responsible for complicated functions as compared to the legacy node B. In a Long Term Evolution (LTE) system, all the user traffic including real time services such as Voice over Internet Protocol (VoIP) are provided through a shared channel and thus there is a need for a device which is located in the eNB to schedule data based on the state information such as at least one of UE buffer conditions, power headroom state, channel state, etc. Typically, one eNB controls a plurality of cells. In order to secure the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE.

The S-GW 130 is an entity that provides data bearers so as to establish and release data bearers under the control of the MME 125. The MME 125 is responsible for various control functions and is connected to the eNBs 105, 110, 115, and 120.

Figure 2:
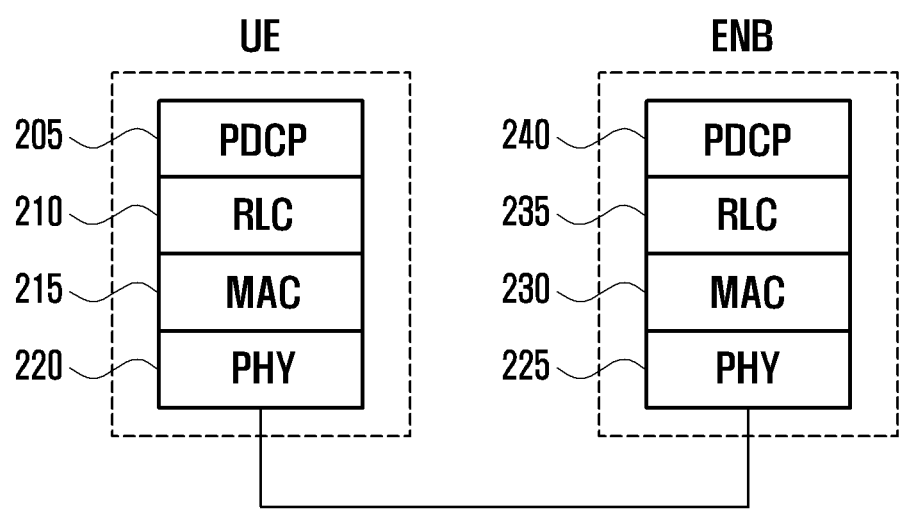
FIG. 2 is a diagram illustrating a protocol stack of a mobile communication system according to an exemplary embodiment of the present invention.

FIG. 2 is a diagram illustrating a protocol stack of a mobile communication system according to an exemplary embodiment of the present invention.

Referring to FIG. 2, the protocol stack of the LTE system for use by a UE and an eNB includes a Packet Data Convergence Protocol (PDCP) layer 205 and 240, a Radio Link Control (RLC) layer 210 and 235, a Medium Access Control (MAC) layer 215 and 230, and a Physical (PHY) layer 220 and 225. The PDCP layer 205 and 240 is responsible for Internet Protocol (IP) header compression/decompression. The RLC layer 210 and 235 is responsible for segmenting the PDCP Protocol Data Unit (PDU) into segments of an appropriate size for an Automatic Repeat Request (ARQ) operation. The MAC layer 215 and 230 is responsible for establishing connection to a plurality of RLC entities so as to multiplex RLC PDUs into MAC PDUs and demultiplex the MAC PDUs into RLC PDUs. The PHY layer 220 and 225 performs channel coding on the MAC PDU and modulates the MAC PDU into OFDM symbols to transmit over a radio channel or performs demodulating and channel-decoding on received OFDM symbols and delivers the decoded data to a higher layer.

Figure 3:
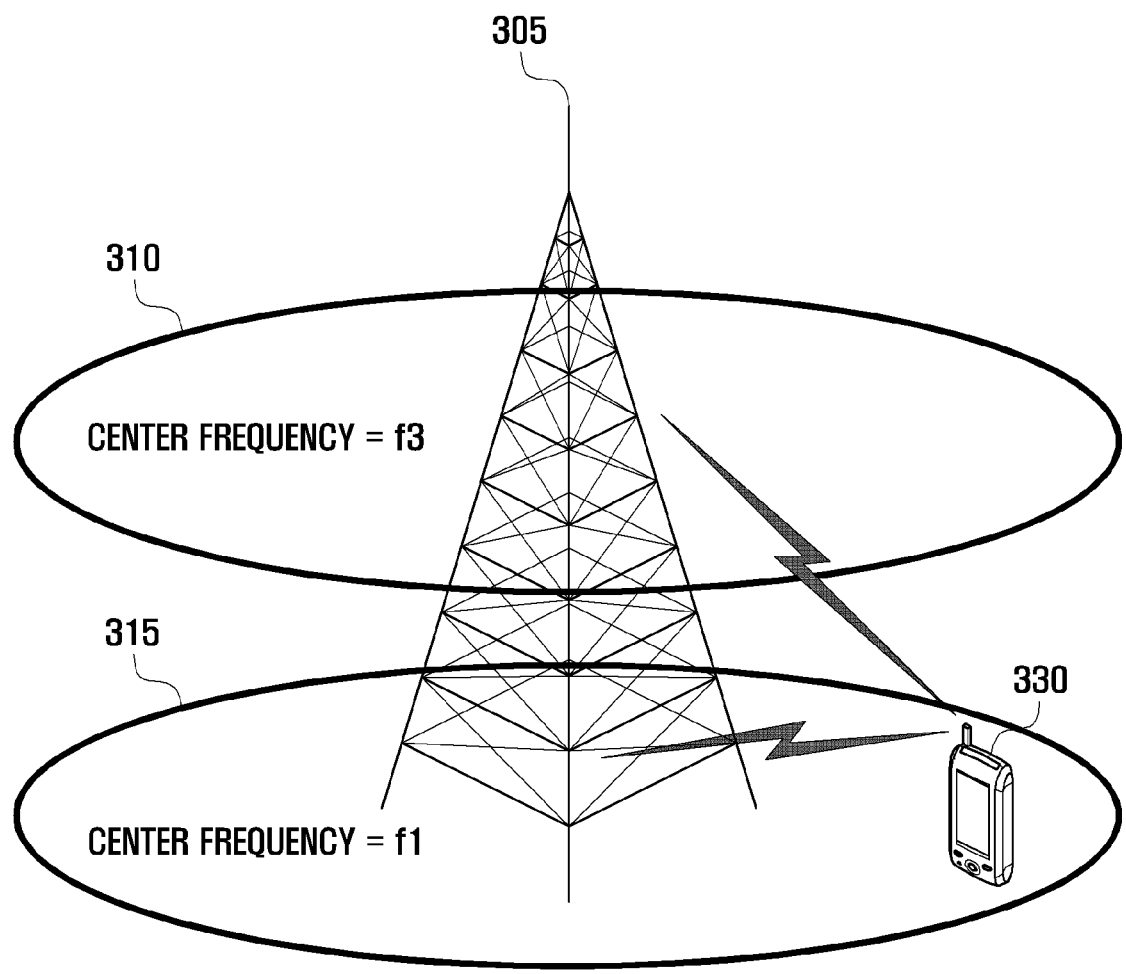
FIG. 3 is a diagram illustrating an exemplary situation of carrier aggregation in a mobile communication system according to an exemplary embodiment of the present invention.

FIG. 3 is a diagram illustrating an exemplary situation of carrier aggregation in a mobile communication system according to an exemplary embodiment of the present invention.

Referring to FIG. 3, typically an eNB can use multiple carriers transmitted and received in different frequency bands. For example, the eNB 305 can be configured to use the carrier 315 with center frequency f1 and the carrier 310 with center frequency f3. If carrier aggregation is not supported, the UE 330 transmits/receives data using one of the carriers 310 and 315. However, the UE 330 having the carrier aggregation capability can transmit/receive data using both of the carriers 310 and 315. The eNB can increase the amount of the resources to be allocated to the UE having the carrier aggregation capability in adaptation to the channel condition of the UE so as to improve the data rate of the UE.

In a case where a cell is configured with one downlink carrier and one uplink carrier as a concept of the related art, the carrier aggregation can be understood as if the UE communicates data via multiple cells. With the use of carrier aggregation, the maximum data rate increases in proportion to the number of aggregated carriers.

In the following description, the phrase "the UE receives data through a certain downlink carrier or transmits data through a certain uplink carrier" means to transmit or receive data through control and data channels provided in a cell corresponding to center frequencies and frequency bands of the downlink and uplink carriers. Although the description is directed to an LTE mobile communication system for explanation convenience, the present invention can be applied to other types of wireless communication systems supporting carrier aggregation. Exemplary embodiments of the present invention propose a method and apparatus for determining uplink carrier transmission power per carrier in uplink transmission of the UE.

In the mobile communication system, a UE calculates a required transmission power for single carrier uplink transmission. The uplink transmission power of the UE is determined by restricting the required transmission power below a predetermined maximum transmission power. The maximum transmission power is the UE-specific maximum transmission power determined depending on the power class of the UE and is determined in consideration of at least one of transmission power reduction (or transmission power backoff) for restricting a cell-specific maximum transmission power, spurious emission caused by the UE's uplink transmission below certain levels, a Specific Absorption Rate (SAR, for controlling influence of the electromagnetic wave to human body below predetermined levels), etc. The required transmission power is the transmission power calculated based on at least one of a given transmission resource, a Modulation and Coding Scheme (MCS) level, a path loss, etc., available for the scheduled uplink transmission. For example, if uplink transmission is scheduled for a UE at a certain time point, the UE calculates required transmission power based on at least one of the given transmission resource, the MCS level, the path loss, etc.

A first exemplary embodiment of the present invention proposes a method and apparatus for configuring uplink transmission power of a UE based on a SAR.

First Exemplary Embodiment

A description is made of the method for determining uplink transmission power in case where multiple serving cells perform uplink transmission in consideration of SAR requirements while maintaining compatibility with an uplink transmission power determination process of the related art that is designed for single serving cell environment. In a case of multicarrier uplink transmission, i.e., if a multicarrier uplink scheduling command for performing uplink transmission in one or more cells (hereinafter, receiving uplink scheduling for a certain cell means being allocated uplink transmission resources and MCS level in the cell), the UE calculates the required transmission power per uplink using the same method as the calculation method of the related art. The UE restricts the required transmission power below a predetermined maximum allowed transmission power.

In the first exemplary embodiment of the present invention, the maximum allowed transmission power per serving cell is referred to as a type 1 maximum transmission power. The UE compares the sum of the values restricted to the type 1 maximum transmission power with another maximum allowed transmission power. Here, the other maximum allowed transmission power is applied to all of the UEs and is referred to as type 2 maximum transmission power. If the sum of the required transmission powers restricted to the type 1 maximum transmission power is greater than the type 2 maximum transmission power, the UE reduces the uplink transmission powers to be equal to the type 2 maximum transmission power according to a predetermined method. For this purpose, the UE determines the type 1 maximum transmission power and type 2 maximum transmission power as follows.

The UE determines parameters such as a Maximum Power Reduction (MPR) and Additive-Maximum Power Reduction (A-MPR) that can be commonly applied to every cell. The UE applies the same MPR and A-MPR to the cells in which uplink transmissions are scheduled. In order to configure the type 2 maximum transmission power, the UE determines the A-MPR (or P-MPR) as a separate transmission power reduction parameter for fulfilling a SAR and applies the determined value. Also, in order to configure the type 2 maximum transmission power, the UE uses a value derived from maximum allowed UE transmission powers ($P_{EMAX}$) and nominal UE power ($P_{PowerClass}$) in the serving cells in which uplink transmissions are scheduled.

Figure 4:
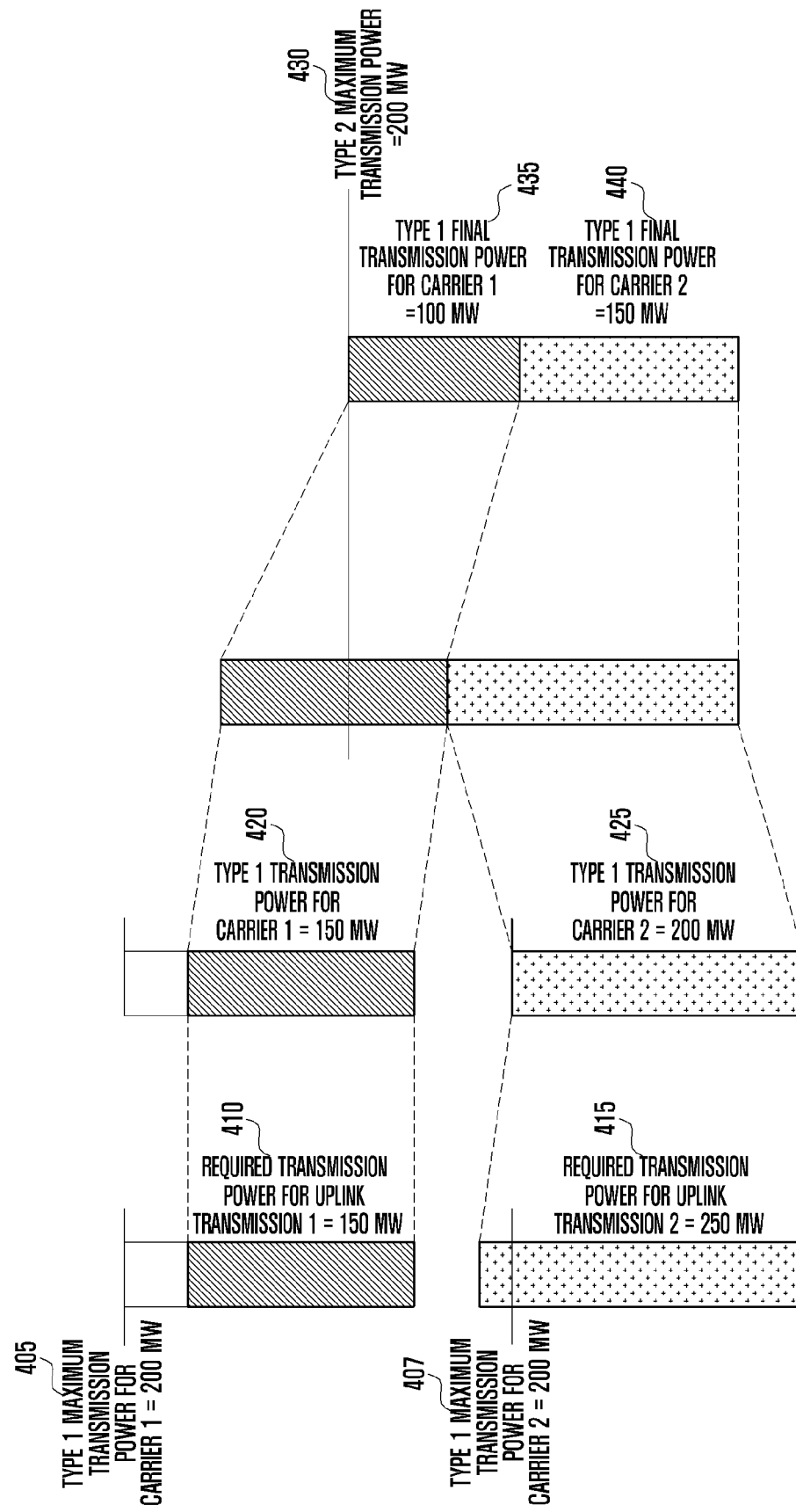
FIG. 4 is a diagram illustrating a principle of determining uplink transmission power in multicarrier transmission of a User Equipment (UE) according to a first exemplary embodiment of the present invention.

FIG. 4 is a diagram illustrating a principle of determining uplink transmission power in multicarrier transmission of a UE according to a first exemplary embodiment of the present invention.

If an uplink scheduling command for uplink transmissions in serving cells 1 and 2 is received, the UE determines its uplink transmission power. In the following description, the terms "carrier" and "cell" are used interchangeably. The term "serving cell" denotes the cell in which downlink and uplink transmissions or downlink transmission are (is) scheduled for the UE configured with carrier aggregation.

The UE determines the type 1 maximum transmission powers for the serving cells 1 and 2. FIG. 4 is depicted under the assumption that the type 1 maximum transmission power 405 of the serving cell 1 (i.e., carrier 1) and the type 1 maximum transmission power 407 of the serving cell 2 (i.e., carrier 2) are 200 mW. Here, the type 1 maximum transmission powers 405 and 407 can be different from each other. How to determine the type 1 maximum transmission powers 405 and 407 of the respective serving cells are described further below in more detail. In a case where the frequency bands of the serving cells 1 and 2 are identical with each other, the same MPR and A-MPR are used to determine the type 1 maximum transmission power.

For this purpose, the UE calculates the required transmission power of each serving cell. In this exemplary embodiment, it is assumed that the required transmission powers 410 and 415 of serving cells 1 and 2 are 150 mW and 250 mW, respectively. Since the required transmission powers 410 and 415 are calculated using the same method as the required transmission power determination method, a detailed description thereof is omitted.

The UE compares the required transmission powers 410 and 415 with the type 1 maximum transmission powers 405 and 407 of the respective serving cells. If the required transmission powers 410 and 415 are greater than the type 1 maximum transmission powers 405 and 407 respectively, the UE sets the uplink transmission powers 420 and 425 to type 1 maximum transmission powers 405 and 407. Otherwise, if the required transmission powers 410 and 415 are equal to or less than the type 1 maximum transmission powers 405 and 407 respectively, the UE sets the uplink transmission power 420 and 425 to the required transmission power 410 and 415. In the following description, the required transmission power per serving cell which is restricted to the corresponding type 1 maximum transmission power (i.e., the minimum value between the required transmission power and type 1 maximum transmission power) is referred to as the type 1 transmission power of the serving cell.

In the exemplary case of FIG. 4, the required transmission power 410 of 150 mW is less than the type 1 maximum transmission power 405 of 200 mW in the serving cell 1. Accordingly, the UE sets the type 1 uplink transmission power 420 of the serving cell 1 to the required transmission power 410 of 150 mW.

Meanwhile, the required transmission power 415 of 250 mW is greater than the type 1 maximum transmission power 407 of 200 mW. Accordingly, the UE sets the type 1 uplink transmission power 425 of the serving cell 2 to the type 1 maximum transmission power 407 of 200 mW.

Afterward, the UE determines whether the sum of the type 1 uplink transmission powers 420 and 425 of the respective serving cells is greater than the type 2 maximum transmission power 430. The type 2 maximum transmission power 430 is configured per UE. The type 2 maximum transmission power is determined in consideration of at least one of P-MPR, $P_{PowerClass}$, and $P_{EMAX}$ of the serving cells. If the sum of the type 1 uplink transmission powers 420 and 425 is equal to or less than the type 2 maximum transmission power 430, the UE sets the uplink transmission powers 435 and 440 as the type 1 uplink transmission powers 420 and 425 of the respective serving cells. Otherwise, if the sum of the type 1 uplink transmission powers 420 and 425 is greater than the type 2 maximum transmission power 430, the UE reduces the sum of the type 1 uplink transmission powers 420 and 425 so as to match the type 2 maximum transmission power 430 according to a predetermined method. In the exemplary case of FIG. 4, if the type 2 maximum transmission power 430 is 250 mW, the sum of the type 1 uplink transmission powers (350 mW) should be reduced by as much as 100 mW. The UE restricts the sum of the type 1 uplink transmission powers 420 and 425 to 250 mW using a predetermined method, e.g., reducing the same amount of power. In the exemplary case of FIG. 4, the final uplink transmission power of the carrier 1 becomes 100 mW while the final uplink transmission power of the carrier 2 becomes 150 mW.

A description is made below of the method for determining the type 1 maximum transmission power and the type 2 maximum transmission power.

<Type 1 Maximum Transmission Power Determination Method>

The type 1 maximum transmission power of a serving cell c ($P_{CMAX,c}$) is determined according to formula (1). In formula (1), the upper limit of the type 1 maximum transmission power ($P_{CMAX\_H,c}$) is determined according to formula (2). The lower limit of type 1 maximum transmission power ($P_{CMAX\_L,c}$) is determined according to formula (3).

$$P_{CMAX\_L,c} \leq P_{CMAX,c} \leq P_{CMAX\_H,c} \tag{1}$$

$$P_{CMAX\_H,c} = \mathrm{MIN}\{P_{EMAX,c}, P_{PowerClass}\} \tag{2}$$

$$P_{CMAX\_L,c} = \mathrm{MIN}\{P_{EMAX,c} - \Delta T_{C,c}, P_{CMAX\_H,c} - MPR_c - A\text{-}MPR_c - \Delta T_{C,c}\} \tag{3}$$

where $P_{EMAX,c}$, $P_{PowerClass}$, $\Delta T_{C,c}$, $MPR_c$, and A-$MPR_c$ are as follows.

$P_{EMAX,c}$ denotes a maximum allowed UE transmission power in the serving cell c which an eNB notifies the UE of. $P_{PowerClass}$ denotes a nominal UE power determined depending on the physical characteristics of the UE. The power class of a UE is determined at the manufacturing state, and the UE reports its power class to the network using a predetermined Radio Resource Control (RRC) message.

$\Delta T_{C,c}$, $MPR_c$, and A-$MPR_c$ are parameters defining a limitation value for calculating maximum transmission power in the serving cell c in order to restrict unintended emission or interference to an adjacent channel to within a certain requirement. In more detail, $\Delta T_{C,c}$ is the value for allowing additional transmission power adjustment in a case where uplink transmission is performed on the edges of a frequency band. For example, if the uplink transmission is performed in a bandwidth corresponding to the lowest or highest 4 MHz of a certain frequency band, the UE sets $\Delta T_{C,c}$ to 1.5 dB and the rest to 0.

$MPR_c$ is the value which is determined based on the amount (i.e., bandwidth) and modulation scheme of the transmission resources allocated to the UE. A-$MPR_c$ is the value which is determined based on the frequency band with uplink transmission, local characteristics, and uplink transmission bandwidth. The A-$MPR_c$ is used for preparing frequency bandwidth particularly sensitive to spurious emission according to local characteristics and frequency band characteristics.

In a case where multiple serving cells are involved in uplink transmission, the aforementioned parameters can be determined per cell. If the cells involved in the uplink transmission are operating on the same frequency band (the frequency band of a certain cell means the entire frequency resource used for data transmission/reception in the cell) and adjacent to each other (e.g., uplink frequency band of cell 1 is x~x+y MHz and uplink frequency band of cell 2 is x+y~x+y+z MHz), the same $\Delta T_{C,c}$, $MPR_c$, and $A\text{-}MPR_c$ are commonly applied to the serving cells. In this case, these parameters are determined at a time even though multiple cells are involved in the uplink transmission.

$\Delta T_{C,c}$, $MPR_c$, and $A\text{-}MPR_c$ are closely associated with the frequency or frequency band of the cell involved in uplink transmission (e.g., whether the uplink transmission is performed at the edge of a given frequency bandwidth), or size and position of the frequency resources for uplink transmission. If n cells are operating on contiguous frequency bands in the same frequency bandwidth, it can be interpreted that n cells are equal to a cell having n-fold frequency band. Accordingly, when the uplink transmission is performed in the cells allocated adjacent frequency bands, it can be modeled that the uplink transmission is performed on the frequency band of one cell which corresponds to the frequency bands allocated the multiple cells. That is, if the cell 1 (frequency band=x~x+y MHz) and the cell 2 (frequency band=x+y~x+y+z MHz) are involved in the uplink transmission, the UE determines $\Delta T_{C,c}$, $MPR_c$, and $A\text{-}MPR_c$ under the assumption of a virtual cell (frequency band=x~x+y+z MHz). Afterward, the UE determines the type 1 maximum transmission powers of the cells 1 and 2 using $\Delta T_{C,c}$, $MPR_c$, and $A\text{-}MPR_c$.

<Type 2 Maximum Transmission Power Determination Method>

The type 2 maximum transmission power $P_{CMAX2}$ of the UE for uplink transmission in multiple cells is determined according to formula (4). In formula (4), the upper limit of type 2 maximum transmission power $P_{CMAX2\_H}$ is determined according to formula (5). The lower limit of type 2 maximum transmission power $P_{CMAX2\_L}$ is determined according to formula (6).

$$P_{CMAX2\_L} \leq P_{CMAX2} \leq P_{CMAX2\_H} \quad (4),$$

$$P_{CMAX2\_H} = MIN\{P_{EMAX2}, P_{PowerClass}\} \quad (5),$$

$$P_{CMAX2\_L} = MIN\{P_{CMAX2\_H} - P\text{-}MPR, \text{Highest } P_{CMAX\_L,c}\} \quad (6)$$

$P_{EMAX}$ is the parameter denoting maximum allowed UE transmission power signaled per cell. Since $P_{EMAX2}$ is of the simultaneous uplink transmissions of multiple cells, it is not clear which $P_{EMAX,c}$ should be used as $P_{EMAX2}$. Accordingly, $P_{EMAX,c}$ is set to the value selected in consideration of $P_{EMAX,c}$ of the cells involved in the uplink transmission. For example, the highest one among the $P_{EMAX,c}$ of the cells involved in the uplink transmission can be selected as $P_{EMAX2}$. Of course another method can be used for determining $P_{EMAX,c}$. Here, $P_{EMAX2\_H}$ can be defined as the value derived from the $P_{PowerClass}$ and $P_{EMAX,c}$'s of all of the cells involved in the uplink transmission. For example, the highest one among the $P_{EMAX,c}$'s of all of the cells can be selected as $P_{EMAX2\_H}$.

P-MPR is the transmission power reduction value applied for fulfilling a SAR requirement and is determined in consideration of the distance between the device and the human body. If the distance between the device and the human body becomes close, then P-MPR is set to a relatively high value since the total transmission power should be decreased. In contrast, if the distance between the device and the human body become far, P-MPR is set to a relatively low value since the total transmission power should be increased.

P-MPR is the parameter for controlling a total amount of electromagnetic energy being radiated from a device. Accordingly, it is preferred to use P-MPR as the parameter for adjusting $P_{CMAX2}$ restricting the entire uplink transmission power of the device rather than as the parameter for adjusting $P_{CMAX,c}$ for restricting the per-cell transmission power of the device. If $P_{CMAX,c}$ is adjusted with P-MPR, it may incur a side effect from using an unnecessarily high P-MPR.

Assuming $P_{CMAX,c}$ of 100 mW for cell 1 and $P_{CMAX,c}$ of 200 mW for cell 2 without consideration of P-MPR, $P_{CMAX2}$ of 200 mW for uplink transmission of UE in the cells 1 and 2, and final transmission power of 150 mW for satisfying the SAR, the P-MPR should be set to 50 mW for cell 1 and 100 mW for cell 2 in order to match the final transmission power of 150 mW by applying the P-MPR to $P_{CMAX,c}$. However, the final transmission power obtained using these values may not have an inappropriate value. That is, if the required transmission powers for both the cells 1 and 2 are 100 mW, the final transmission powers for the cells 1 and 2 that are obtained by applying the P-MPR separately become 50 mW and 100 mW respectively. This means that the transmission power reduction occurs only for the cell 1. In contrast, if the P-MPR is applied to $P_{CMAX2}$, the sum of the type 1 transmission power of 100 mW for cell 1 and the type 1 transmission power of 100 mW for cell 2 is limited to $P_{CMAX2}$ adjusted by P-MPR, i.e., 150 mW. Accordingly, the transmission power reduction is applied for the cells 1 and 2, resulting in final transmission power of 75 mW for both the cells 1 and 2. This means that it is preferred to apply P-MPR to $P_{CMAX2}$ for configuring transmission power of the UE.

As described above, the UE determines $P_{CMAX2}$ by applying at least one of $P_{EMAX}$'s for the cells involved in uplink transmission, $P_{PowerClass}$, P-MPR, $\Delta T_{C,c}$, $MPR_c$, and $A\text{-}MPR_c$.

Figure 5:
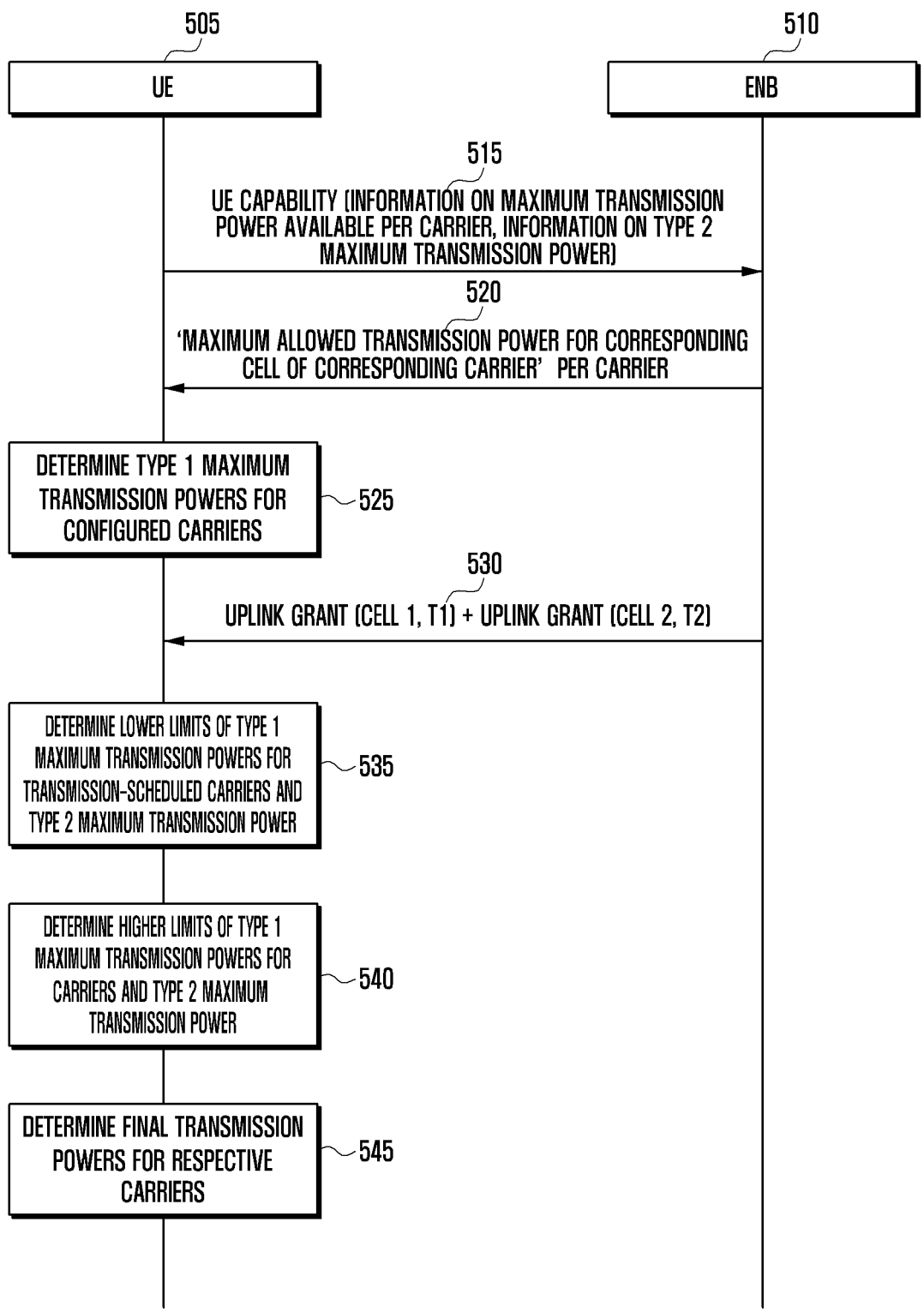
FIG. 5 is a signaling diagram illustrating a method for determining uplink transmission power of a UE according to the first exemplary embodiment of the present invention.

FIG. 5 is a signaling diagram illustrating a method for determining uplink transmission power of a UE according to the first exemplary embodiment of the present invention. The mobile communication system depicted in FIG. 5 includes a UE 505 supporting multicarrier uplink transmission and an eNB 510 supporting carrier aggregation.

Referring to FIG. 5, the UE 505 sends the eNB 510 a message such as UE capability report message carrying the information on type 1 maximum transmission power and type 2 maximum transmission power in step 515. The information on the type 2 maximum transmission power is the information provided for the eNB 510 to check the type 2 maximum transmission power of the UE 505. The information on the type 2 maximum transmission power can be the information directly indicating the type 2 maximum transmission power or the information on the Power Class of the UE 505.

The eNB 510 sends the UE 505 information on the maxim allowed transmission power $P_{EMAX,c}$ per serving cell, i.e., carrier, in step 520. $P_{EMAX,c}$ is the parameter indicating the maximum allowed UE output power for cell c in consideration of inter-cell interference. $P_{EMAX,c}$ can be transmitted to the UE 505 in system information or in a predetermined control message for the redundant serving cells configured for the UE 505. In more detail, when the UE has only one serving cell before aggregating carriers, the $P_{EMAX,c}$ for the corresponding cell can be acquired in the system information of the corresponding cell. However, $P_{EMAX,c}$ for the serving cells of which carriers are newly aggregated can be informed through a peer to peer control message, i.e., a RRC CONNECTION RECONFIGURATION message, transmitted from the eNB to the UE.

The UE 505 determines the type 1 maximum transmission power per carrier using $P_{EMAX,c}$ and $P_{PowerClass}$ provided by the eNB 510 in step 525. The upper limit of the type 1 maximum transmission power is determined according to formula (2). Afterward, the UE receives an uplink scheduling command instructing uplink transmission in multiple serving cells from the eNB 510 in step 530. For example, the UE 515 receives the uplink grant (CELL 1, t1) instructing the uplink transmission in cell 1 of carrier 1 at time t1 and the uplink grant (CELL 1, t2) instructing the uplink transmission in cell 2 of carrier 2 at time t2.

The UE 505 determines the lower limits of the type 1 maximum transmission powers for the carriers on which transmission is scheduled and type 2 maximum transmission power in step 535. In more detail, if the frequency bands of the cells involved in the uplink transmission are adjacent with each other in a given frequency bandwidth, the UE determines a set of $\Delta T_{C,c}$, $MPR_c$, and $A\text{-}MPR_c$ in consideration of the conditions of the two cells. Next, the UE determines the lower limit of the type 1 maximum transmission power for the serving cells using formula (3). The UE 505 also determines the type 2 maximum transmission power according to formulas (4) to (6).

Next, the UE 505 determines the type 1 maximum transmission powers for carriers and type 2 maximum transmission power in step 540. Finally, the UE determines the final transmission power per carrier in step 545. In more detail, the UE 505 determines the uplink transmission power per serving cell using the selected type 1 maximum transmission power and type 2 maximum transmission power. The UE 505 calculates the required transmission power per serving cell. Next, the UE 505 limits the required transmission power to the type 1 maximum transmission power for the corresponding serving cell so as to determine the type 1 uplink transmission power per serving cell. The UE 505 calculates the sum of the per-cell type 1 uplink transmission powers and compares the sum of the per-cell type 1 uplink transmission powers with the type 2 maximum transmission power. If the sum of the per-cell type 1 uplink transmission powers is equal to or less than the type 2 maximum transmission power, the UE determines the per-cell type 1 uplink transmission powers as the uplink transmission powers of the serving cells. If a sum of the per-cell type 1 uplink transmission powers is greater than the type 2 maximum transmission power, the UE performs transmission power reduction on the per-cell type 1 uplink transmission powers to limit the sum of the per-cell type 1 uplink transmission powers to the type 2 maximum transmission power.

Figure 6:
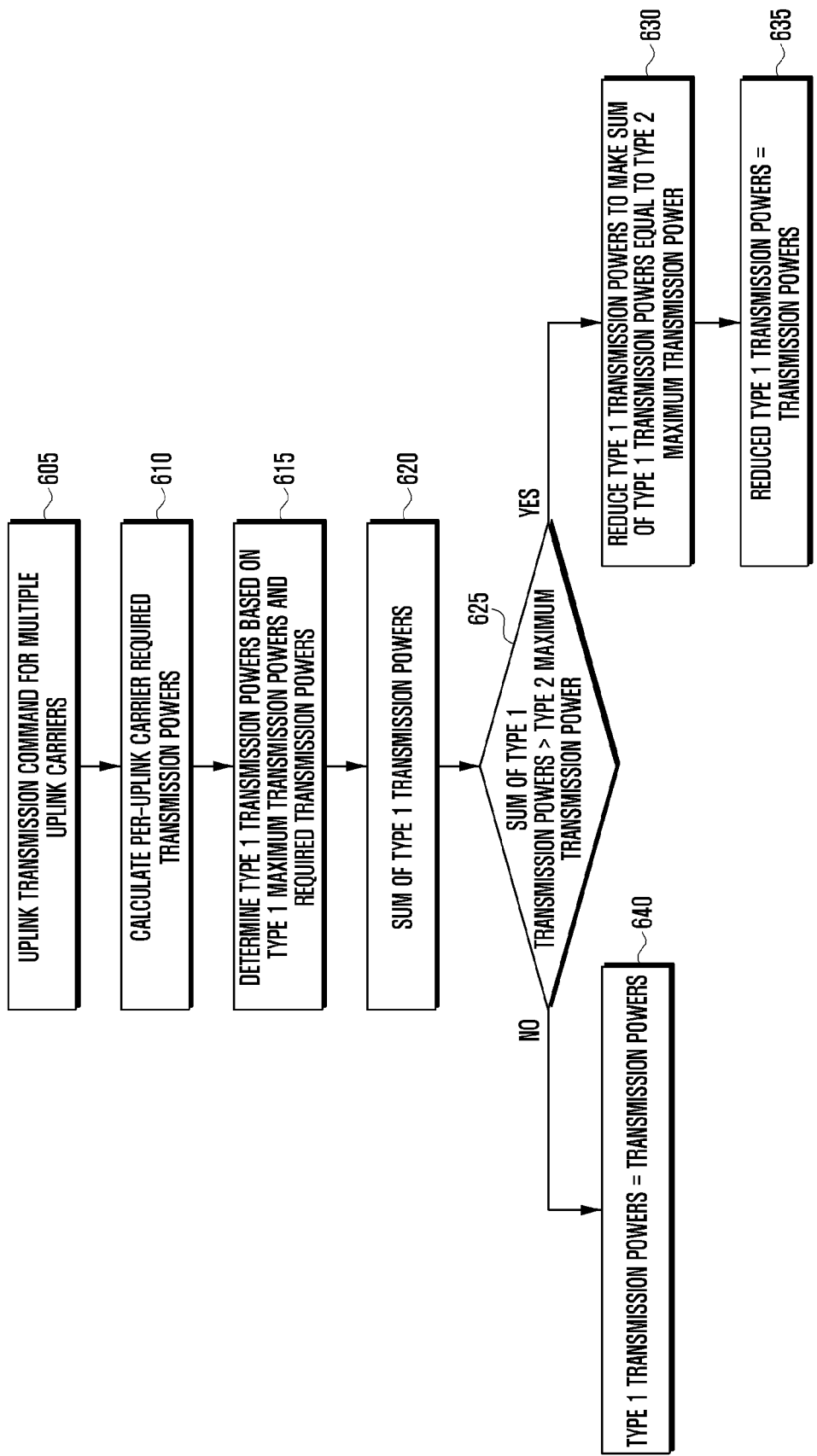
FIG. 6 is a flowchart illustrating a method for determining uplink transmission power of a UE according to the first exemplary embodiment of the present invention.

FIG. 6 is a flowchart illustrating a method for determining uplink transmission power of a UE according to the first exemplary embodiment of the present invention.

Referring to FIG. 6, the UE receives a command for multicarrier uplink transmission in step 605. Upon receipt of the multicarrier uplink transmission command, the UE determines uplink transmission power in step 610.

At step 610, the UE calculates required transmission power per uplink carrier. Next, the UE determines type 1 transmission powers based on per-carrier type 1 maximum transmission powers and per-carrier required transmission powers in step 615. That is, the UE determines the minimum value between the type 1 maximum transmission power and the required transmission power for the corresponding carrier as the type 1 uplink transmission power for the corresponding carrier. Here, the UE can apply the same $\Delta T_{C,c}$, $MPR_c$, and $A\text{-}MPR_c$ to determine the type 1 maximum transmission powers for respective serving cells.

The UE adds up the type 1 uplink transmission powers in step 620. Next, the UE determines whether the sum of the type 1 uplink transmission powers is greater than the type 2 maximum transmission power in step 625. Here, the type 2 maximum transmission power is determined based on the following parameters:

$P_{EMAX}$'s for cells involved in uplink transmission;
$P_{PowerClass}$ of UE;
P-MPR at corresponding time point; and
$\Delta T_{C,c}$, $MPR_c$, and $A\text{-}MPR_c$ used for determining type 1 maximum transmission powers.

If the sum of the type 1 uplink transmission powers is greater than the type 2 maximum transmission power at step 625, the UE reduces the type 1 uplink transmission powers such that the sum of the type 1 uplink transmission powers is equal to the type 2 maximum transmission power in step 630. For example, the UE divides a difference between the sum of the type 1 uplink transmission powers and the type 2 maximum transmission power by a number of type 1 uplink transmission powers and subtracts the resulting value from the respective type 1 uplink transmission powers. Next, the UE determines the reduced type 1 uplink transmission powers as the final uplink transmission powers for the respective carriers in step 635.

If the sum of the type 1 uplink transmission powers is equal to or less than the type 2 maximum transmission power at step 625, the UE determines the type 1 uplink transmission powers as the final uplink transmission powers for the respective carriers in step 640.

Figure 7:
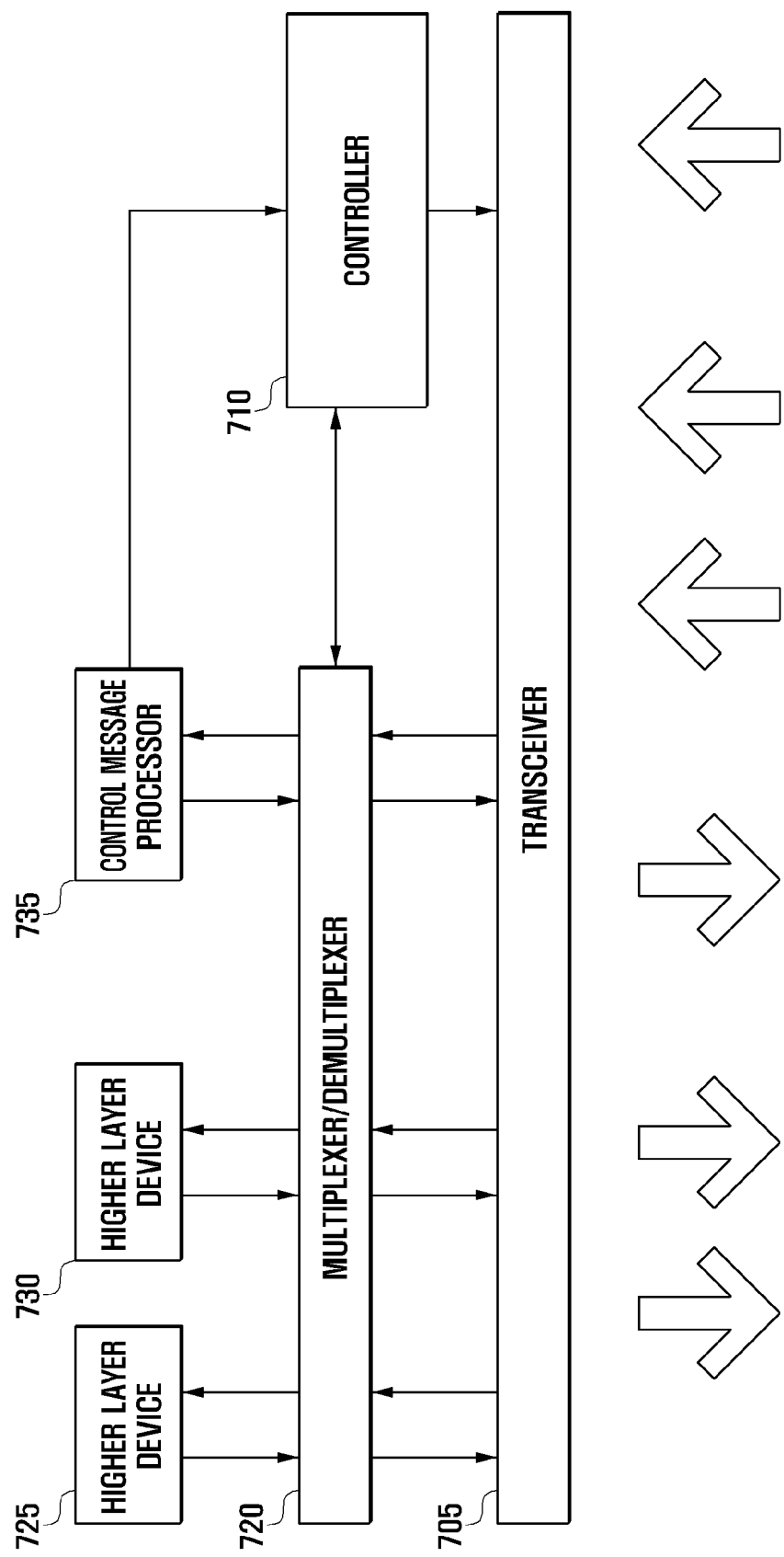
FIG. 7 is a block diagram illustrating a configuration of a UE according to the first exemplary embodiment of the present invention.

FIG. 7 is a block diagram illustrating a configuration of a UE according to the first exemplary embodiment of the present invention.

Referring to FIG. 7, the UE according to an exemplary embodiment of the present invention includes a transceiver 705, a controller 710, a multiplexer/demultiplexer 720, higher layer devices 725 and 730, and a control message processor 735.

The transceiver 705 receives data and control signals on downlink channels of the serving cell and transmits data and control signals on uplink channels of the serving cell. In a case where multiple serving cells are configured, the transceiver 705 performs data and control signal transmission/reception in the multiple serving cells.

The controller 710 checks scheduling commands, e.g., uplink grants, received by the transceiver 705 and controls the transceiver 705 and the multiplexer/demultiplexer 720 to perform uplink transmission with an appropriate transmission resource at an appropriate time. That is, the controller 710 determines type 1 maximum transmission power per carrier for uplink transmission according to formulas (1) to (3).

The controller 710 also determines the type 2 maximum transmission power according to formulas (4) to (6). Next, the controller 710 determines the type 1 uplink transmission power by comparing the required transmission power with the determined type 1 maximum transmission power per cell as shown in step 615 of FIG. 6. The controller 710 also determines the final uplink transmission power per serving cell by comparing the sum of the type 1 uplink transmission powers for individual serving cells with the determined type 2 maximum transmission power. The controller 710 also controls the transceiver 705 to perform uplink transmission with the final uplink transmission power determined per carrier.

The multiplexer/demultiplexer 720 can multiplex the data generated by the higher layer devices 725 and/or control message processor 735. The multiplexer/demultiplexer 720 also can demultiplex the received data to be transferred to the higher layer devices 725 and 730 and/or the control message processing unit 735.

Each of the higher layer devices 725 and 730 is configured per service. The higher layer devices 725 and 730 process the data generated by a user service such as File Transfer Protocol (FTP) or VoIP and deliver the process result to the multiplexer/demultiplexer 720 or process the data from the multiplexer/demultiplexer 720 and delivers the process result to the service applications of a higher layer.

The control message processor 735 processes the control message received from the eNB and takes an appropriate action. That is, the control message processor 735 extracts the uplink transmission power configuration information per serving cell, e.g., $P_{EMAX,c}$ per serving cell, from the control message and delivers the extracted information to the controller 710.

Second Exemplary Embodiment

The displacement of $P_{CMAX2}$ is important information referenced by the eNB for uplink scheduling. The second exemplary embodiment of the present invention proposes a method for reporting the displacement of $P_{CMAX2}$ when the displacement of $P_{CMAX2}$ of the UE becomes greater than a predetermined value.

The second exemplary embodiment of the present invention may use the Power Headroom Report (PHR) MAC Control Element (CE) of the related art rather than introducing a new control message for reporting $P_{CMAX2}$.

The PHR MAC CE is the control message for the UE to notify the eNB of the Power Headroom (PH) of the UE. Here, PH is the difference between $P_{CMAX}$ and required transmission power. One PHR includes PHs of multiple serving cells. PHR is triggered when a predetermined condition is fulfilled and multiplexed in a MAC PDU in the first uplink transmission.

In the present exemplary embodiment, the PHR trigger condition includes the condition where the displacement of $P_{CMAX2}$ becomes equal to or greater than a predetermined value.

Figure 8:
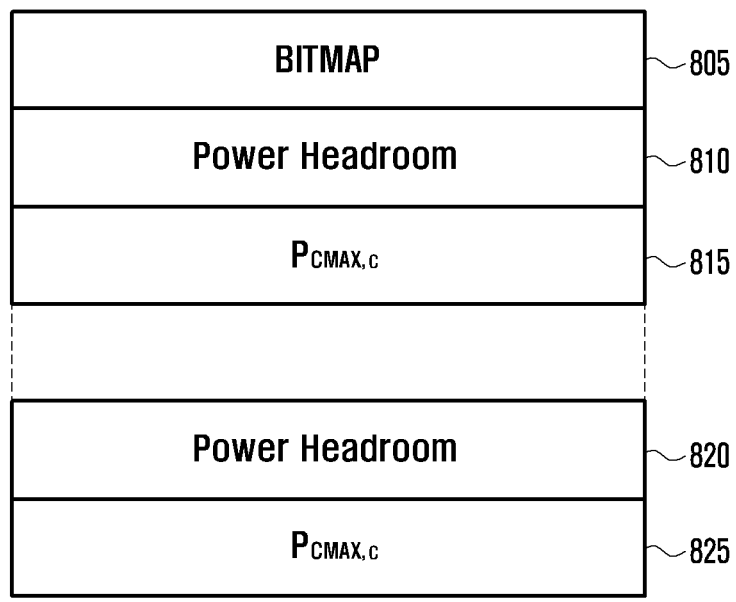
FIG. 8 is a diagram illustrating a structure of a Power Headroom Report (PHR) for use in an uplink transmission power configuration method according to an exemplary embodiment of the present invention.

FIG. 8 is a diagram illustrating a structure of a PHR for use in an uplink transmission power configuration method according to an exemplary embodiment of the present invention.

Referring to FIG. 8, PHR is composed of a 1-byte bitmap 805 and a plurality of PHs 810 and 820 paired with $P_{CMAX,c}$ 815 and 825. The bitmap 805 indicates the serving cells for which PH is included. The PHR includes PHs for the serving cells activated at the time when the PHR is triggered, and $P_{CMAX,c}$ is included selectively. If there is only one serving cell in an active state or no redundant uplink carrier is configured, the PHR is formed as a combination of a bitmap and a PH/$P_{CMAX,c}$.

In a case where there is only one serving cell in active state, $P_{CMAX2}$ is reported in the $P_{CMAX,c}$ field of the related art. In a case where there is more than one active cell, a new field is introduced to report $P_{CMAX2}$. That is, $P_{CMAX2}$ is reported in the $P_{CMAX,c}$ field when there is only one active cell since $P_{CMAX,c}$ and $P_{CMAX2}$ are equal to each other and in a separate field when there is more than one active cell since the $P_{CMAX,c}$ and $P_{CMAX2}$ are different from each other.

In a case where there is more than one active cell, the eNB notifies the UE of the existence of the $P_{CMAX2}$ field using a predetermined bit of the bitmap. The predetermined bit can be the last bit of the bitmap.

Figure 9:
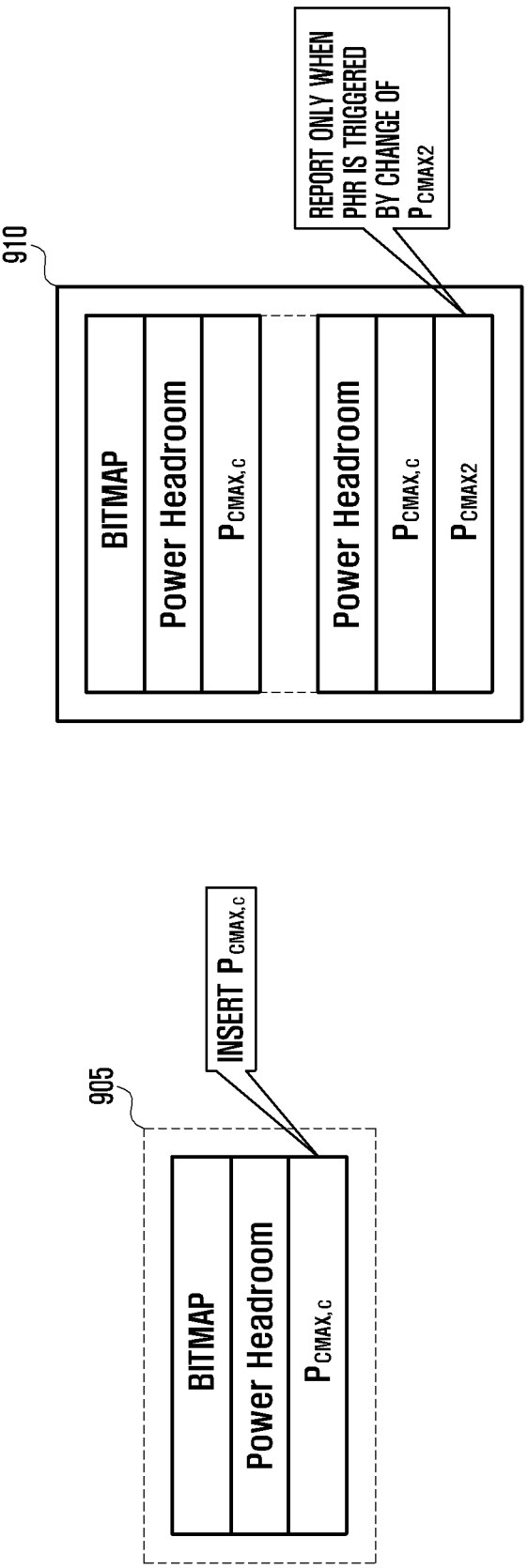
FIG. 9 is a diagram illustrating a structure of a PHR for use in an uplink transmission power configuration method according to a second exemplary embodiment of the present invention.

FIG. 9 is a diagram illustrating a structure of PHR for use in an uplink transmission power configuration method according to a second exemplary embodiment of the present invention.

FIG. 9 shows a PHR format 905 for use in the case where only one active cell exists and another PHR format 910 for used in the case where more than one active cell exists. That is, the first PHR format 905 includes a $P_{CMAX2}$ field containing $P_{CMAX2}$ for the active cell. The second PHR format 910 is used when PHR is triggered according to the change of $P_{CMAX2}$.

In a PHR function configuration state, the eNB can configure a $P_{CMAX2}$ report in order for the UE to report $P_{CMAX2}$ or not. That is, the eNB sends the UE a one-bit information indicating whether $P_{CMAX2}$ is to be reported. If the $P_{CMAX2}$ report is configured positively, the UE sends a PHR containing $P_{CMAX2}$.

Figure 10:
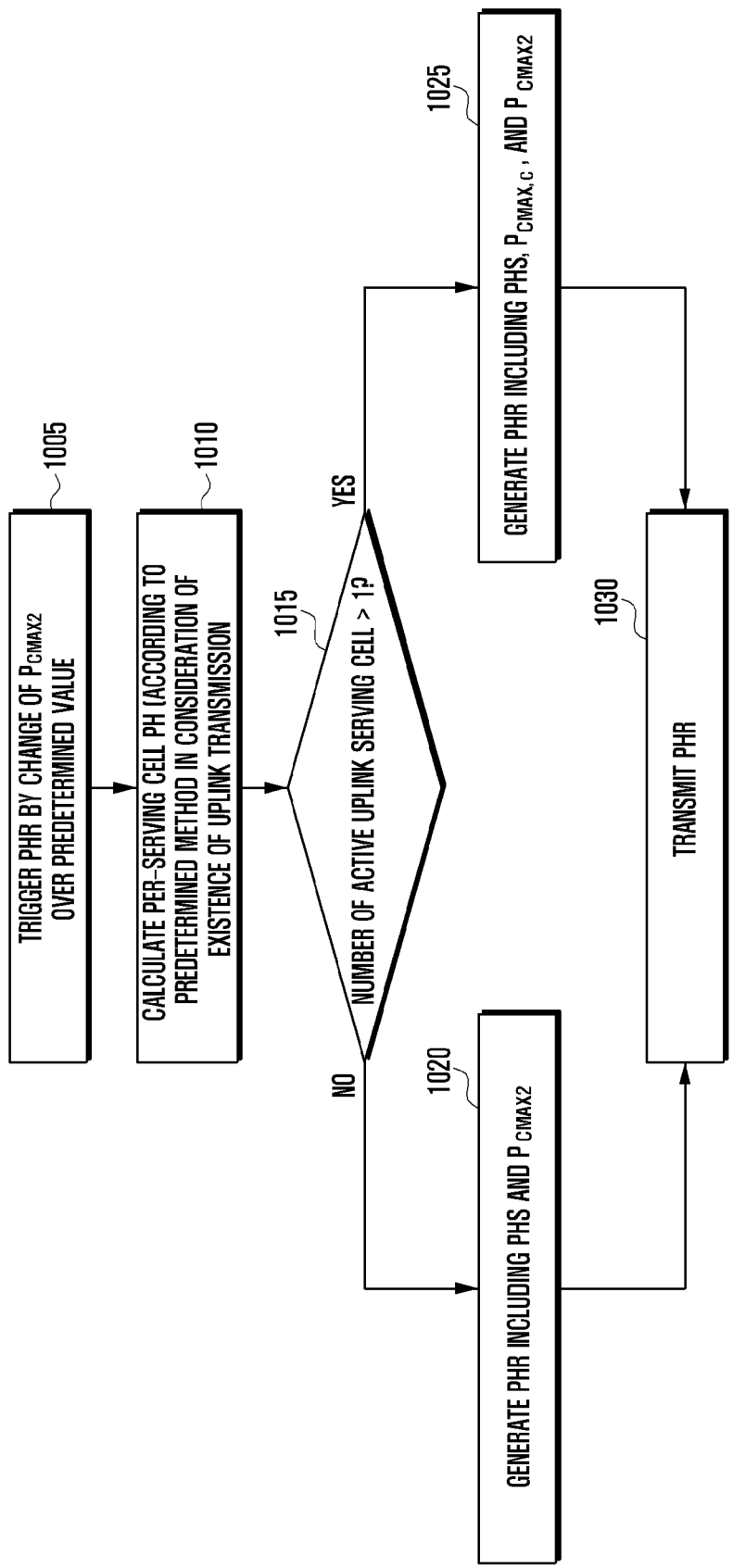
FIG. 10 is a flowchart illustrating a method for transmitting a PHR according to the second exemplary embodiment of the present invention.

FIG. 10 is a flowchart illustrating a method for transmitting a PHR according to the second exemplary embodiment of the present invention.

Referring to FIG. 10, the displacement of $P_{CMAX2}$ becomes greater than a predetermined value so as to trigger PHR in step 1005\. PHR is triggered when the path loss of a reference cell (i.e., path loss reference cell) changes more than a predetermined amount among the active cells or a predetermined time duration elapses after transmission of the PHR. If the path loss in a certain serving cell A is referenced for another serving cell B, this means that the pass loss of the serving cell A is referenced for determining the uplink transmission power in the serving cell B. Accordingly, when the serving cells A and B are identical with each other, the uplink transmission power can be determined using the path loss of the downlink channel of each cell. When the serving cells A and B are different from each other, the uplink transmission power can be determined using the path loss on respective downlink channels. In this case, the eNB informs the UE of the path loss reference cell through RRC signaling. The UE calculates $P_{CMAX2}$ using formulas (4), (5), and (6) and, if the $P_{CMAX2}$ has changed by more than a predetermined amount as compared to the most recently received value, the PHR is triggered.

The UE calculates PH per serving cell according to a predetermined method in consideration of the existence of uplink transmission in step 1010. That is, the UE calculates PHs of the cells currently in an active state. At this time, the UE calculates PH in a different manner according to whether a certain serving cell has real uplink transmission. The UE uses <PH calculation method 1> for the serving cell having real uplink transmission and <PH calculation method 2> for the serving cell having no real uplink transmission. <PH calculation method 1> is defined as follows.

<PH Calculation Method 1>

$$PH = \text{Real } P_{CMAX,c} - \text{Real } PUSCH \text{ power}$$

The real $P_{CMAX,c}$ is the maximum transmission power of the serving cell c which is determined by formulas (1), (2), and (3) in a situation where a real MAC PDU is transmitted. Formula (3) can be modified to formula (7) in consideration of P-MPR$_c$.

$$P_{CMAX2\_L,c} = \text{MIN}\{P_{EMAX,c} - P\text{-}MPR_c - T_{C,c}, P_{CMAX2\_H,c} - MPR_c - A\text{-}MPR_c - T_{C,c}\} \quad (7)$$

The real PUSCH power is the transmission power required for transmitting MAC PDU while guaranteeing a predetermined transmission quality. The PUSCH power of an $i^{th}$ subframe in the serving cell c is calculated using formula (8)

with the number of resource block $M_{PUSCH,c}(i)$, power offset induced from MCS $\Delta_{TF,c}$, path loss $PL_c$, and TPC command accumulation value $f_c(i)$.

$$PUSCH\ power(i) = \{10\ \log_{10}(M_{PUSCH,c}(i)) + P_{O\_PUCCH,c}(j) + \alpha_c(j) \cdot PL_c + \Delta_{TF,c}(i) + f_c(i)\} \quad (8)$$

In formula (8), $PL_c$ denotes the path loss in the cell configured to provide the service cell c with the path loss. That is, the path loss used for determining uplink transmission power in a certain serving cell is the path loss of the downlink channel of the corresponding cell or the path loss of the downlink channel of a different cell. The path loss to be used is notified by the eNB to the UE in the call setup process.

In formula (8), $f_c(i)$ denotes the accumulation value of Transmission Power Control (TPC) in serving cell c. $P_{O\_PUCCH,c}$ denotes a higher layer parameter composed of cell-specific and UE-specific values. $\alpha_c$ denotes the weight applied to the path loss when the uplink transmission power is calculated using the 3-bit cell-specific value provided from higher layers. As $\alpha_c$ increases, the influence of the path loss to the uplink transmission power increases.

<PH Calculation Method 2>

$$PH = \text{Reference } P_{CMAX,c} - \text{Reference } PUSCH\ power$$

The Reference $P_{CMAX,c}$ denotes the maximum transmission power in the cell having no real uplink transmission. Since no real uplink transmission occurs, the maximum transmission power has no real meaning but is used to calculate PH. The Reference $P_{CMAX,c}$ is the value obtained using formulas (1), (2), and (7) when P-$MPR_c$, $T_{C,c}$, and A-$MPR_c$ are all set to 0. The reason why the parameters are set to 0 is to notify the eNB of the value of Reference $P_{CMAX,c}$ without a separate report for $P_{CMAX,c}$. In other words, if one of the parameters is set to a non-zero value, the eNB cannot be aware of the $P_{CMAX,c}$ used in the PH calculation such that it is necessary to report $P_{CMAX,c}$ separately. However, it is difficult to acquire an accurate $P_{CMAX,c}$ from PH for the serving cell having no real uplink transmission. Accordingly, the parameters for the serving cell having no real uplink transmission are set to 0 in order to negate the report of inaccurate information, resulting in removal of inefficiency.

The Reference PUSCH power is calculated by applying formula (8) under the assumption of scheduling of 1 transmission resource block with the lowest MCS. That is, $M_{PUSCH,c}(i)$ as Reference PUSCH power is set to 1, and $\Delta_{TF,c}$ is set to the lowest value of 0 as shown in formula (9).

$$PUSCH\ power(i) = \{P_{O\_PUSCH,c}(j) + \alpha_c(j) \cdot PL_c + f_c(i)\} \quad (9)$$

The UE calculates PHs of the serving cells currently in an active state using <PH calculation method 1> and <PH calculation method 2>, and the procedure proceeds to step 1015.

The UE determines whether a number of currently active uplink serving cells is greater than 1 in step 1015. The uplink serving cell means the serving cell configured for uplink transmission. If the number of currently active uplink serving cells is 1, the procedure goes to step 1020 and, otherwise, if the number of currently active uplink serving cells is greater than 1, goes to step 1025.

At step 1020, the UE generates PHR in the format as denoted by reference number 905 of FIG. 9. The PHR includes PHs of the serving cells in an active state, and the $P_{CMAX,c}$ field contains $P_{CMAX2}$. Since the $P_{CMAX2}$ and the $P_{CMAX,c}$ are identical with each other when only one active uplink serving cell exists, it is not necessary for the UE to report the $P_{CMAX2}$ separately. Accordingly, when there is only one active uplink serving cell, the UE does not report $P_{CMAX2}$.

At step 1025, the UE generates PHR in the format as denoted by reference number 910 of FIG. 9. That is, the UE configures the first byte of the PHR to indicate the PHs included in the corresponding PHR. The last bit of the first byte is used for indicating whether $P_{CMAX2}$ filed exists. If PHR is triggered due to the change of $P_{CMAX2}$, the UE inserts $P_{CMAX2}$ in PHR and sets the last bit of the first byte to 1. Next, the UE inserts the PHs of the uplink serving cells in an active state. In a case where PH is calculated using the PH calculation method 1 (i.e., using real $P_{CMAX,c}$ and real PUSCH power, or if there is real uplink transmission in the corresponding serving cell), the UE reports $P_{CMAX,c}$ too. Otherwise, if PH is calculated using the PH calculation method 2 (i.e., using reference $P_{CMAX,c}$ and reference PUSCH power, or if there is no real uplink transmission in the corresponding serving cell), the UE does not report $P_{CMAX,c}$.

The UE inserts $P_{CMAX2}$ in the last byte. The UE can insert the value obtained by subtracting the sum of the uplink transmission powers for use in the active uplink serving cells from $P_{CMAX2}$ rather than $P_{CMAX2}$ itself.

Finally, the UE encapsulates the generated PHR in a MAC PDU and transmits the MAC PDU to the eNB in step 1030.

The UE according to the second exemplary embodiment of the present invention is identical with that of the first exemplary embodiment except for the operations the multiplexer/demultiplexer.

In the second exemplary embodiment, the controller determines whether PHR is triggered, calculates PHs for active serving cells, $P_{CMAX,c}$, and $P_{CMAX2}$, generates PHR, and delivers the PHR to the multiplexer/demultiplexer. The multiplexer/demultiplexer according to the second exemplary embodiment multiplexes the PHR from the controller into a MAC PDU and transfers the MAC PDU to the transceiver.

As described above, the uplink transmission power configuration method and apparatus of exemplary embodiments of the present invention is capable of determining the uplink transmission power efficiently while minimizing the inter-frequency band or inter-cell interference and maintaining the required transmission powers for aggregated uplink carriers as much as possible in the mobile communication system supporting carrier aggregation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for determining uplink transmission power of a user equipment (UE) supporting carrier aggregation, the method comprising:
   receiving uplink scheduling information for performing uplink transmission in at least two serving cells from a base station;
   determining a first uplink maximum transmission power of each of the at least two serving cells;
   determining a second uplink maximum transmission power of the UE; and
   determining an uplink transmission power of each of the at least two serving cells based on the first uplink maximum transmission power of each of the at least two serving cells and the second uplink maximum transmission power of the UE,
   wherein a lower limit of the second uplink maximum transmission power is determined based on a maximum power reduction (MPR) parameter, an additive-maximum power reduction (A-MPR) parameter and a p-maximum power reduction (P-MPR).

2. The method of claim 1, wherein an upper limit of the second uplink maximum transmission power is determined based on information on maximum allowed transmission power of each of the at least two serving cells involved in the uplink transmission of the UE and information related to power class of the UE.

3. The method of claim 1, wherein the determining of the first uplink maximum transmission power of each of the at least two serving cells comprises applying a maximum power reduction (MPR) parameter and an additive-maximum power reduction (A-MPR) parameter commonly to serving cells involved in the uplink transmission of the UE.

4. The method of claim 3, wherein the MPR parameter and the A-MPR parameter are commonly applied to each of the at least two serving cells, when the cells involved in the uplink transmission of the UE are operating on the same frequency band and adjacent to each other.

5. The method of claim 1, wherein the determining of the first uplink maximum transmission power of each of the at least two serving cells and the determining of the second uplink maximum transmission power of the UE comprises applying an identical MPR and an identical A-MPR commonly.

6. The method of claim 1, wherein the determining of the first uplink maximum transmission power of each of the at least two serving cells comprises comparing the first uplink maximum transmission power of each of the at least two serving cells and a required transmission power of each of the at least two serving cells.

7. The method of claim 1, further comprising:
receiving information related to maximum allowed transmission power of each of the at least two serving cells for determining the first uplink maximum transmission power of each of the at least two serving cells,
wherein the information related to serving cell before carrier aggregation is acquired via a SYSTEM INFORMATION message, the information related to serving cells after a carrier aggregation is acquired via a RRC CONNECTION RECONFIGURATION message.

8. The method of claim 1, wherein the determining of the uplink transmission power of each of the at least two serving cells comprises:
when a sum of the first uplink maximum transmission power of each of the at least two serving cells is greater than a per-UE maximum output power, reducing the first uplink transmission maximum power to make the sum of the first uplink maximum transmission power of each of the at least two serving cells equal to the second uplink maximum transmission power; and
determining the reduced first uplink maximum transmission power of each of the at least two serving cells as the uplink transmission power of each of the at least two serving cells.

9. The method of claim 1, wherein the determining of the uplink transmission power of each of the at least two serving cells comprises, when a sum of the first uplink maximum transmission power of each of the at least two serving cells is equal to or less than the second uplink maximum transmission power, determining the first uplink maximum transmission power of each of the at least two serving cells as the uplink transmission power of each of the at least two serving cells.

10. An apparatus for determining uplink transmission power of a user equipment (UE) supporting carrier aggregation, the apparatus comprising:

a transceiver configured to transmit and receive data in multiple serving cells; and
a controller configured to receive uplink scheduling information for performing uplink transmission in at least two serving cell from a base station, to control to determine a first uplink maximum transmission power of each of the at least two serving cells, to determine a second uplink maximum transmission power of the UE, and to determine a uplink transmission power of each of the at least two serving cells based on the first uplink maximum transmission power of each of the at least two serving cells and the second uplink maximum transmission power of the UE,
wherein a lower limit of the second uplink maximum transmission power is determined based on a Maximum Power Reduction (MPR) parameter, an Additive-Maximum Power Reduction (A-MPR) parameter and a P-Maximum Power Reduction (P-MPR).

11. The apparatus of claim 10, wherein an upper limit of the second uplink maximum transmission power is determined based on information on maximum allowed transmission power of each of the at least two serving cells involved in the uplink transmission of the UE and information related to a power class of the UE.

12. The apparatus of claim 10, wherein the controller is further configured to apply a maximum power reduction (MPR) parameter and an additive-maximum power reduction (A-MPR) parameter commonly to serving cells involved in the uplink transmission of the UE, when the UE determines the first uplink maximum transmission power of each of the at least two serving cells.

13. The apparatus of claim 12, wherein the MPR parameter and the A-MPR parameter are commonly applied to each of the at least serving cells, when the cells involved in the uplink transmission of the UE are operating on the same frequency band and adjacent to each other.

14. The apparatus of claim 10, wherein the controller is further configured to apply an identical MPR and an identical A-MPR commonly, when the UE determines the first uplink maximum transmission power of each of the at least two serving cells and the second uplink maximum transmission power of the UE.

15. The apparatus of claim 10, wherein the controller is further configured to compare the first uplink maximum transmission power of each of the at least two serving cells and a required transmission power of each of the at least two serving cells.

16. The apparatus of claim 10, wherein the controller is further configured to control to receive information related to a maximum allowed transmission power of each of the at least two serving cells for determining the first uplink maximum transmission power of each of the at least two serving cells,
wherein the information related to serving cell before carrier aggregation is acquired via a SYSTEM INFORMATION message, the information related to serving cells after a carrier aggregation is acquired via a RRC CONNECTION RECONFIGURATION message.

17. The apparatus of claim 10, wherein the controller is further configured to control, when the UE determines an uplink transmission power of each of the at least two serving cells and when a sum of the first uplink maximum transmission power of each of the at least two serving cells is greater than a per-UE maximum output power, to reduce the first uplink transmission maximum power to make the sum of the first uplink maximum transmission power of each of the at least two serving cells equal to the second uplink maximum transmission power, and to determine the reduced first uplink maximum transmission power of each of the at least two serving cells as the uplink transmission power of each of the at least two serving cells.

18. The apparatus of claim 10, wherein the controller is further configured to control, when the UE determines a uplink transmission power of each of the at least two serving cells and when a sum of the first uplink maximum transmission power of each of the at least two serving cells is equal to or less than the second uplink maximum transmission power, to determine the first uplink maximum transmission power of each of the at least two serving cells as the uplink transmission power of each of the at least two serving cells.

* * * * *